July 1, 1958 — R. K. LITTLE — 2,841,357
PINCH VALVE
Filed Oct. 27, 1954 — 2 Sheets-Sheet 1
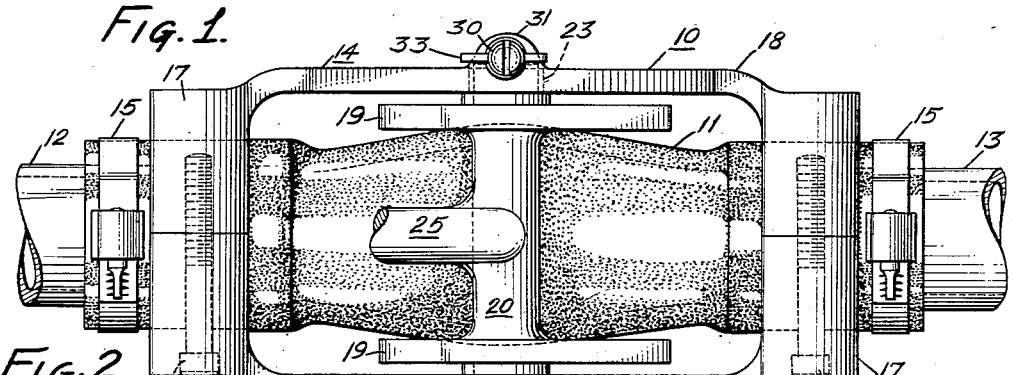
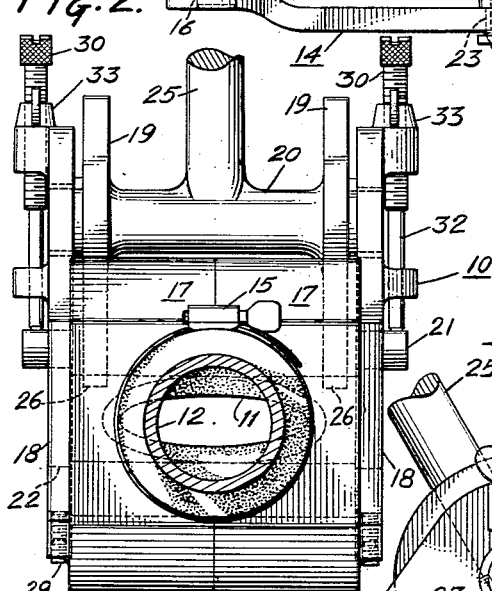
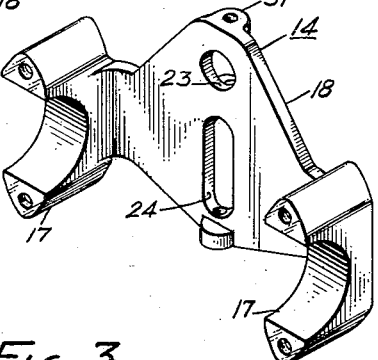
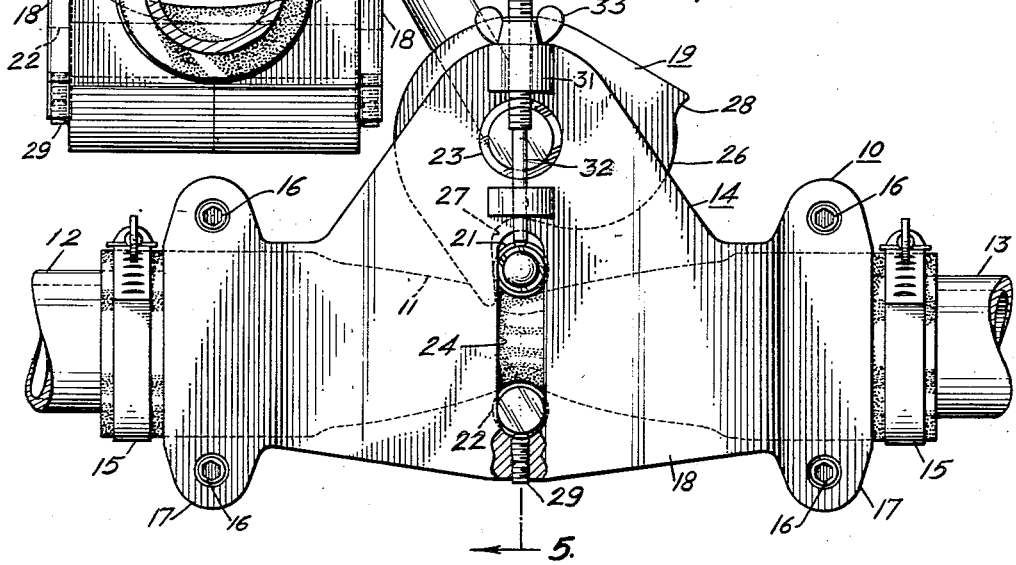
INVENTOR:
ROBERT K. LITTLE
BY Howson & Howson
ATTYS.

July 1, 1958   R. K. LITTLE   2,841,357
PINCH VALVE

Filed Oct. 27, 1954   2 Sheets-Sheet 2

INVENTOR:
ROBERT K. LITTLE
BY Howson & Howson
ATTYS.

United States Patent Office 2,841,357
Patented July 1, 1958

2,841,357

PINCH VALVE

Robert K. Little, Philadelphia, Pa.

Application October 27, 1954, Serial No. 465,057

3 Claims. (Cl. 251—6)

This invention relates to valves of the pinch type, i. e., to valves in which a pair of opposed closure members or jaws are moved relatively toward and away from each other to compress a length of flexible tubing to closed position or release it to open position.

An object of the invention has been to provide a valve of this type which is rugged in its construction and in the manner of its securement in operative position, and which is at the same time simple and reliable in its operation.

A further object has been to provide a valve having these characteristics in which the opposed valve closing and valve opening movements are manually controlled through mechanism which is definite and positive in its action.

A further object has been to provide such a valve with mechanical connections for opening and closing movements, and at the same time with positive stop means to limit the expansion of the tubing to open position, so that it remains in partially collapsed, compressed, condition when the valve is open.

A further object has been to provide such a valve which can be quickly and positively operated, but in which the extent of expansion of the tubing to open position may be readily adjusted as desired.

Figure 5:
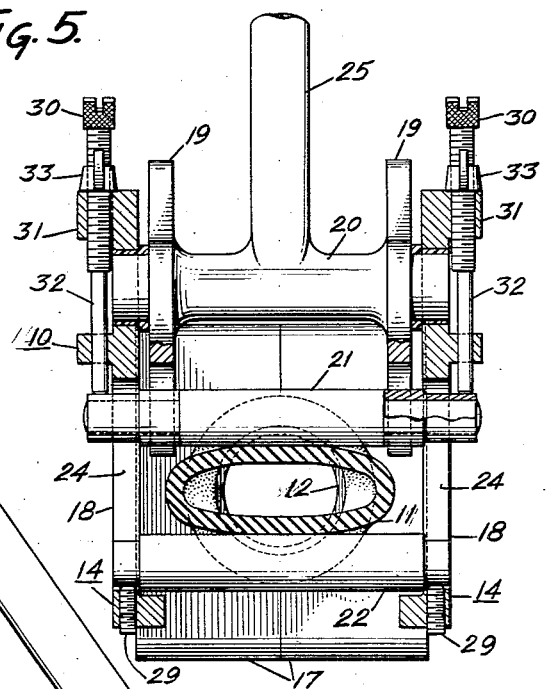
Figure 6:
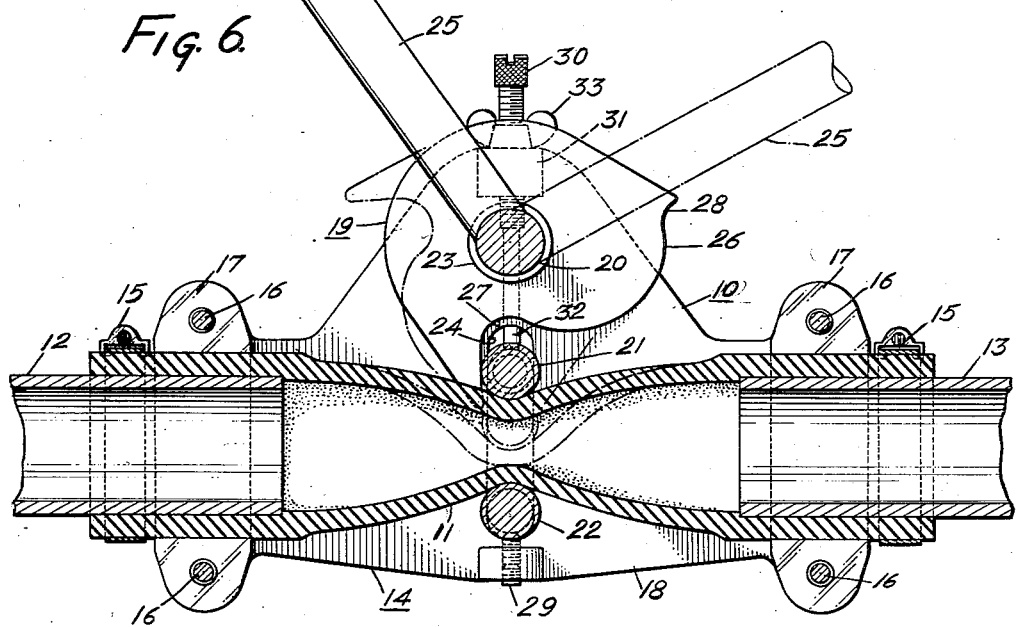

Still further objects and advantages of the invention, and the manner in which they have been attained, will be apparent from reading of the following detailed description in the light of the attached drawing, in which, Figure 1 is a plan view of the valve of the invention, Figure 2 is an end view, Figure 3 is a side elevation, Figure 4 is a perspective of one of the side clamping and actuator mounting members, Figure 5 is a cross-section on the line 5—5 of Figure 3, and Figure 6 is a central longitudinal vertical cross-section.

By reference to the drawings, it will be seen that the valve 10 of my invention embodies a flexible and elastic tubing member 11 adapted to be telescoped about opposing ends of conduit members 12 and 13, and opposed clamping members 14 designed to support the valve operating mechanism in operative relationship to the flexible tubing member 11. The tubing 11 may be initially secured at its opposite ends around conduits 12 and 13 by conventional split ring clamps 15, and the clamping members 14 thereafter secured to each other by screws or bolts 16 interconnecting the ends of their opposed clamping jaws 17. These are complementally curved to embrace and clamp opposite ends of the tubing member 11 and enclosed conduit ends, to fasten them securely and mount the clamping members 14 firmly in place.

The side plates 18 of the clamping members 14 extend on opposite sides of the tubing through substantially its entire length, and these plates serve as mountings for the valve actuating and controlling mechanism.

The actuating mechanism comprises a pair of cams 19 mounted for rotation with shaft 20 in bearings in holes 23 through opposed side plates 18. Upper and lower rollers 21 and 22 are mounted on opposite sides of the tubing 11 with their ends bearing in elongated slots 24 located below the holes 23. The rollers 21 and 22 are thus mounted for relative movement toward and away from each other to positions for compressing the tubing to valve closing position and allowing it to expand under its own elasticity and/or fluid pressure to valve opening position.

In the embodiment illustrated, the lower roller 22 remains stationary during actuation of the valve, while the upper roller 21 is moved toward or from it by actuation of the cams 19. This actuation may be performed manually by manipulation of a handle 25 secured to a central portion of the shaft 20, and the actuation of the valve from the open position illustrated in Figures 3 and 6 to the closed position illustrated in broken lines in Figure 6 is achieved by operation of the handle 25 from the full to the broken line position of Figure 6. In this movement the roller 21 is moved downwardly by the rotating cam surfaces 26, and in moving from the position where cam portions 27 overlie the roller to the position in which cam portions 28 overlie it, the cam actuation produces pinching of the tubing to close the valve.

It should be noted that the projections on the cams immediately arcuately beyond positions 27 and 28 establish definite positions corresponding to fully open and fully closed conditions, and that the operator can ascertain, from feel of the operating handle, when he reaches these positions. In the movement to closed position, the walls of the tubing are not merely compressed to abutting relationship, but are still further squeezed, just before the clockwise movement reaches closed position, but the thickness and elasticity of the tubing are sufficient to accommodate this squeezing force, which is somewhat relieved as the cam portions 28 come to overlie the roller. In the reverse movement to open position, the roller 21 is caused to move upwardly and follow the cam surfaces by elasticity and fluid pressure, as discussed above.

It will be seen that the function of the roller 22 is to provide a reaction surface against which the compressing and closing action may smoothly take place, and the positioning of this roller is made adjustable by mounting it in the lower ends of the slots 24. This adjustment is attained by manipulation of screws 29 threaded through the under side of the plates 18 and extending upwardly into slots 24.

It is desirable that the tubing be maintained in partially collapsed and compressed condition even when the valve is at open location, and I provide a combination in which this result is simply and effectively achieved while at the same time enabling the extent of such compression to be adjusted. To this end I provide adjustment screws 30 extending downwardly through threaded bosses 31 at opposite edges of side plates 18, and these screws carry at their lower ends downwardly extending shanks or pins 32 which bear against the upper surfaces of bearing portions of the rollers 21, as illustrated in Figure 5. By adjusting screws 30 and setting them in their adjusted positions by wing nuts 33, the positioning of rollers 21 when the valve is open may be adjusted to any location desired, and the extent of opening of the valve by actuation of handle 25 may therefore be controlled independently of the exact shape of the cam.

From the foregoing discussion, it will be evident that I have provided a valve which fulfills every one of the objects of the invention. However, it will be evident to those skilled in the art that various modifications and refinements may be devised without departing from its basic scope, and I therefore wish it to be understood that I am not to be limited except by the following claims.

I claim:

1. In a pinch type valve, the combination comprising a flexible, longitudinally extending, tubing member designed to be clamped about opposed ends of conduit members coupled by the valve, a pair of complemental supporting and clamping members mounted on opposite sides of said longitudinally extending tubing member, each of said complemental clamping members extending the entire length between the locations at which said tubing member is clamped about said conduit members and being provided with a pair of clamping jaws at said locations for co-action with complementally located clamping jaws of the opposite complemental member in securing said complemental members in gripping relation about said tubing member and conduit sections, each of said complemental members including side plate portions between said clamping locations having a slot extending transversely with respect to the axis of the tubing, a pair of pinch bars having their opposite ends mounted for sliding movement within said slots, means for adjusting the position of at least one of said pinch bars within said slots, an actuating shaft, bearings within said side plate portions for said shaft, cam means secured to said shaft and bearing on one of said pinch bars for moving said pinch bar to valve closing position, and means for adjusting the position of the other of said pinch bars within said slots.

2. A pinch valve as defined in claim 1, including adjustable stop means for limiting the movement of said cam-actuated pinch bar to open position.

3. In a pinch type valve, the combination comprising a flexible, longitudinally extending, tubing member designed to be clamped about opposed ends of conduit members coupled by the valve, a pair of complemental supporting and clamping members mounted on opposite sides of said longitudinally extending tubing member, each of said complemental clamping members extending the entire length between the locations at which said tubing member is clamped about said conduit members and being provided with a pair of clamping jaws at said locations for co-action with complementally located clamping jaws of the opposite complemental member in securing said complemental members in gripping relation about said tubing member and conduit sections, each of said complemental members including side plate portions between said clamping locations having a slot extending transversely with respect to the axis of the tubing, a pair of pinch bars having their opposite ends mounted for sliding movement within said slots, a shaft mounted partially on each of said side plate portions, means actuated by said shaft for causing relative movement of one said pinch bar relative to the other within said slots to valve-closing position, said other pinch bar being adjustably positioned in said slots.

References Cited in the file of this patent

UNITED STATES PATENTS

| | | |
|---|---|---|
| 517,180 | Wilson | Mar. 27, 1894 |
| 1,087,093 | Tarbox | Feb. 10, 1914 |
| 2,167,952 | Jordan | Aug. 1, 1939 |
| 2,396,544 | Voyle | Mar. 12, 1946 |
| 2,533,264 | Jurs | Dec. 12, 1950 |
| 2,674,435 | Angell | Apr. 6, 1954 |

FOREIGN PATENTS

| | | |
|---|---|---|
| 395,948 | Great Britain | 1933 |